(12) United States Patent
Nelson et al.

(10) Patent No.: US 11,647,479 B2
(45) Date of Patent: May 9, 2023

(54) MULTI-LEVEL SIGNAL TRANSMISSION SYSTEM FOR WIRELESS DEVICE LOCATION

(71) Applicant: CauZway, LLC, Framingham, MA (US)

(72) Inventors: David L. Nelson, Framingham, MA (US); Richard H. Spellman, Randolph, MA (US)

(73) Assignee: CAUZWAY, LLC, Randolph, MA (US)

( * ) Notice: Subject to any disclaimer, the term of this patent is extended or adjusted under 35 U.S.C. 154(b) by 0 days.

(21) Appl. No.: 16/750,576

(22) Filed: Jan. 23, 2020

(65) Prior Publication Data

US 2020/0245287 A1 Jul. 30, 2020

Related U.S. Application Data

(60) Provisional application No. 62/797,069, filed on Jan. 25, 2019.

(51) Int. Cl.

| | |
|---|---|
| *H04W 64/00* | (2009.01) |
| *H04W 4/029* | (2018.01) |
| *G06F 1/16* | (2006.01) |
| *H04W 4/80* | (2018.01) |
| *H04W 84/18* | (2009.01) |
| *G06N 3/02* | (2006.01) |

(52) U.S. Cl.
CPC .......... *H04W 64/003* (2013.01); *G06F 1/163* (2013.01); *G06N 3/02* (2013.01); *H04W 4/029* (2018.02); *H04W 4/80* (2018.02); *H04W 84/18* (2013.01)

(58) Field of Classification Search
CPC ..... H04W 64/003; H04W 4/029; H04W 4/80; H04W 84/18; G06F 1/163; G06N 3/02
USPC ........................................................ 455/456
See application file for complete search history.

(56) References Cited

U.S. PATENT DOCUMENTS

| 10,251,018 B1* | 4/2019 | Susel ...................... H04W 4/02 |
| 10,264,405 B1* | 4/2019 | Manku .................... H04W 4/029 |
| 11,024,105 B1* | 6/2021 | Brand ....................... G07C 9/10 |
| 2005/0176370 A1* | 8/2005 | McSheffrey .......... H04W 88/02 |
| | | 455/466 |

(Continued)

*Primary Examiner* — Charles N Appiah
*Assistant Examiner* — Nicole M Louis-Fils
(74) *Attorney, Agent, or Firm* — D'Ambrosio & Menon, PLLC; Usha Menon

(57) ABSTRACT

The present invention relates to systems and methods for measuring signal strength emitted by a wireless portable device to determine the location of the wireless portable device. The wireless portable device may be located within a designated geographical location, premise or facility. The measurement involves two levels of transmissions. A first level involves a user's wireless portable device receiving signals from a plurality of beacons in the vicinity. The second level involves transmission of repeater signals from a mesh network. The payload of these signals, which may include a duress signal, includes the strength of the received beacon signals, so that when the duress signal is received by a controller, the signal strengths of both levels/types of transmissions can be determined. This two-level collection of signals is then processed by a neural network which have been previously trained to classify the signal collections into precise locations.

7 Claims, 3 Drawing Sheets

(56) References Cited

U.S. PATENT DOCUMENTS

| | | | |
|---|---|---|---|
| 2009/0231189 A1* | 9/2009 | Reddy | G01S 19/05 342/357.42 |
| 2016/0174022 A1* | 6/2016 | Nhu | H04W 4/70 455/41.2 |
| 2017/0310553 A1* | 10/2017 | Welters | H04W 48/16 |
| 2018/0196972 A1* | 7/2018 | Lu | H04W 84/18 |
| 2018/0288563 A1* | 10/2018 | Krzych | H04B 17/27 |
| 2018/0293478 A1* | 10/2018 | Cannell | G06K 19/0723 |
| 2022/0070971 A1* | 3/2022 | Wang | H04W 48/08 |

\* cited by examiner

MULTI-LEVEL SIGNAL TRANSMISSION SYSTEM FOR WIRELESS DEVICE LOCATION

CROSS-REFERENCE TO RELATED APPLICATION

This application claims the benefit of Provisional U.S. Patent Application No. 62/797,069, filed Jan. 25, 2019, entitled "Multi-Level Signal Transmission System for Wireless Device Location", the entire content and disclosure of which, both express and implied, is incorporated herein by reference.

BACKGROUND OF THE INVENTION

Wireless portable devices, such as, pendants, are worn by people in situations where they may need emergency help, such as the elderly, security personnel, employees in hospitals, hotels, and other professions. In duress situations, a button on the device is pushed and signals are transmitted to a control unit which initiates appropriate action. Since the device is portable, and the carrier/wearer of the device is frequently mobile, the actual location of the emergency is often uncertain. In other applications, the wireless device may be attached to various pieces of portable equipment (also known as assets) throughout a facility, such as mobile equipment in hospitals, factories, and more. Determining accurate location of these assets often requires expensive infrastructure such as RFID readers, scanners, cameras, and so on. However, again, it is difficult to determine the location of the device accurately. Conventionally, in these types of systems (asset tracking), the transmission is initiated at known locations (e.g., RFID) and the location can be accordingly determined. In both of these examples location information is key to successful operation.

Determining location of devices based on signal strength is an established technique to locate cell phones as well as devices that detect signals such as WiFi from distributions of routers. In some cases, neural networks have processed Wifi signals for location determination with some success. More recently, Bluetooth BLE beacons have been used to determine location for a growing number of applications. However, their limited signal strength and mu limits the usefulness of the applications. Accordingly, there is a need for a system that can facilitate the accurate location of wireless portable devices.

FIELD OF THE INVENTION

The present invention relates to systems and methods for measuring signal strength emitted by a wireless portable device to determine the location of the wireless portable device. The wireless portable device may be located within a designated geographical location, premise or facility. The measurement involves two levels of transmissions. A first level involves a user's wireless portable device receiving signals from a plurality of Bluetooth beacons in the vicinity. The second level involves transmission of repeater signals from a mesh network by the wireless portable device. The payload of these signals, which may include a duress signal, includes the strength of the received beacon signals, so that when the duress signal is received by a control unit, the signal strengths of both levels/types of transmissions can be determined. This two-level collection of signals is then processed by neural networks which have been previously trained to classify the signal collections into precise locations.

SUMMARY OF THE INVENTION

The present invention relates to systems and methods for measuring signal strength emitted by a wireless portable device to determine the location of the wireless portable device. The wireless portable device may be located within a designated geographical location, premise or facility. The measurement involves two levels of transmissions. A first level involves a user's wireless portable device receiving signals from a plurality of Bluetooth beacons in the vicinity. The second level involves transmission of repeater signals from a mesh network by the wireless portable device. The payload of these signals, which may include a duress signal, includes the strength of the received beacon signals, so that when the duress signal is received by a control unit, the signal strengths of both levels/types of transmissions can be determined. This two level collection of signals is then processed by neural networks which have been previously trained to classify the signal collections into precise locations According to an embodiment, a method for accurately detecting the location of a portable asset, involves: activating the portable asset to receive a signal transmitted by a location tracking device in its vicinity; analyzing the received signal to determine at least a signal strength and an identifier associated with the location tracking device; transmitting the analyzed signal to a mesh network, wherein the mesh network comprises one or more signal repeaters; forwarding the signal received from the location tracking device and signals transmitted by the mesh network to a controller; and analyzing the signals from the location tracking device and the mesh network to accurately determine the location of the portable asset. The location of portable asset is transmitted to a client device for display to a user.

In one embodiment, the portable asset is a mobile computing device. A mobile computing device can include a smartphone, a smartwatch, a laptop, a tablet, and other similar devices. The mobile computing device is a wireless device which can be Bluetooth enabled.

In another embodiment, the portable asset is a wearable device. A wearable device can include a badge, a pendant or any other device or equipment that includes a Bluetooth receiver and transmitter.

In an embodiment, the location tracking device comprises one or more beacons. The beacons can be positioned in proximity to the portable asset. The portable asset includes a software application configured to be launched whenever a beacon is detected in the vicinity of the portable asset. The software application is configured to process the signals received from the one or more beacons determine at least a signal strength and an identifier associated with the one or more beacons.

In an embodiment, the controller comprises a neural network. The neural network is trained to parse the signals from the location tracking device and the mesh network to accurately determine the location of the portable asset. The neural network facilitates the arrangement of the beacons and the signal repeaters in an ad hoc manner. Training the neural network comprises measuring the signal strength within a geographical space where the portable asset is potentially located. The location of the portable asset is generated using the neural network training. The generated location is compared to an actual location of the portable asset to further train the neural network until the neural network is trained to determine a substantially accurate location. The neural network is configured to determine: (i) a general section of the mesh network covered by the signal repeaters; and (ii) a specific area within that section determined by the beacons.

In another embodiment, a location tracking system is disclosed. The location tracking system includes: a processor; and a computer memory operatively coupled to the processor. The computer memory has disposed within it computer program instructions for: activating the portable asset to receive a signal transmitted by a location tracking device in its vicinity; analyzing the received signal to determine at least a signal strength and an identifier associated with the location tracking device; transmitting the analyzed signal to a mesh network; forwarding the signal received from the location tracking device and signals transmitted by the mesh network to a controller; and analyzing the signals from the location tracking device and the mesh network to accurately determine the location of the portable asset.

BRIEF DESCRIPTION OF THE DRAWINGS

Appended

FIG. 1 depicts a multi-level system for accurately locating a wireless portable device in accordance with an embodiment.

FIG. 2 depicts a signal processing through trained neural networks in accordance with an embodiment.

FIG. 3 depicts method for accurately locating a wireless portable device in accordance with an embodiment.

DESCRIPTION OF THE PREFERRED EMBODIMENTS

The present disclosure relates to various systems and methods for determining the location of a portable asset located in a defined geographical space using a multi-level signal transmission mechanism. The portable asset is configured to receive a signal from a location tracking device. The received signal is formatted or assembled and then broadcast to a wireless mesh network. The mesh network forwards the assembled signal to a tracking application. The tracking application is configured to process the forwarded signal to accurately track the location of the portable asset.

Figure 1:
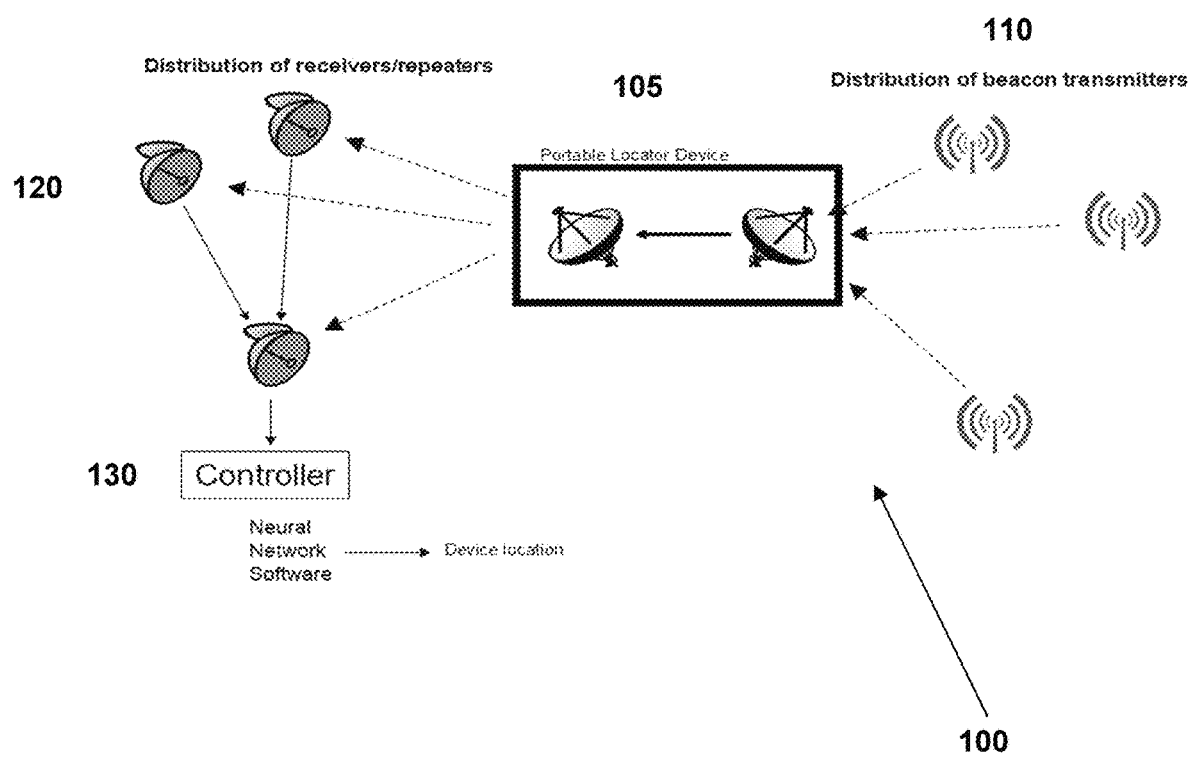
FIGS. 1-3 depict certain non-limiting embodiments of a multi-level system for accurately locating wireless portable devices. The figures are not intended to limit the scope of the invention but, instead, are intended to provide depictions of specific embodiments, features and non-limiting characteristics of the systems described herein. The accompanying figures further illustrate the present invention. The components of an embodiment shown in the drawings are not necessarily drawn to scale, emphasis instead being placed upon clearly illustrating the principles of the present invention.

FIG. 1 is a drawing depicting an exemplary scenario showing a portable asset 105 being tracked by a location tracking system 100 according to an embodiment of the present disclosure. The tracking system 100 can include one or more location tracking devices 110, a software application that is installed on the portable asset 105, one or more signal repeaters 120, and a controller 130 comprising a neural network for determining the location of the portable asset 105 based on an analysis of the signals transmitted by the location tracking devices 110 and the signal repeaters 120.

In an embodiment, the portable asset 105 comprises a mobile computing device. The mobile computing device can include, without limitation, a smartphone, smartwatch, laptop and tablet. The mobile computing device is configured to configured with a software application that is associated with one or more location tracking devices 110 in its vicinity. The location tracking device 110 can include one or more beacons.

Beacons are known in the art. A beacon is essentially a radio transmitter that sends out a one-way signal to Bluetooth-enabled mobile devices equipped to receive it. Beacon signals are transmitted in a limited geographical region or localized zones. Typically, each zone is around 100 feet. Zone coverage can be extended by using an array of beacons.

In order to receive the beacon signal, it is important to turn on the Bluetooth in the mobile computing device 105. The beacons 110 are configured to transmit a low-power short-range signal (a Bluetooth Low Energy or BLE signal). The signals can be detected by the software application installed on the mobile computing device 105. If the Bluetooth in the mobile computing device 105 is turned on, the software application can be configured to be launched automatically whenever it detects a beacon in its vicinity.

Conventional location tracking beacons have to be precisely placed in a regular array in the vicinity of the mobile computing device. However, according the various embodiments of this invention, the beacons can be organized in various clusters and/or subsets in any ad hoc manner in the three-dimensional space that is in the vicinity of the mobile computing device 105.

The signals transmitted by the beacons 110 can include one or more parameters. For example, the parameters can include a universally unique identifier. The software application collects and assembles the signal to include information on one or more location determination parameters, such as, the strength of the signal received from the beacons, geographical identifiers and any other preconfigured data. The assembled signal can be transmitted using Bluetooth to a mesh network 120 within range of the portable asset 105.

In another embodiment, the portable asset 105 can include a wearable device. An exemplary wearable device can include an identification badge or a pendant. The wearable device is provided with a Bluetooth transmitter and receiver. The wearable device can include an activation mechanism (such as, a button). When the button is actuated (such as, by touching or pressing on it), the Bluetooth is turned on. This ensures that the wearable device can receive signals from location tracking devices 110 (such as, beacons or geofences) in its vicinity. The wearable device can include a software application that is launched when it detects the location tracking device in its vicinity. The software application collects and assembles the signal to include information on one or more location determination parameters, such as, the strength of the signal received from the location tracking devices 110, geographical identifiers and any other preconfigured data. The assembled signal can be transmitted using Bluetooth to a mesh network 120 within range of the portable asset 105.

In an embodiment, in non-emergency situations, the portable asset 105 can be configured to periodically report its location to a controller 130. In certain embodiments, the portable asset can report its location to the controller 130 either periodically and/or whenever a new Bluetooth beacon or location tracking device is detected. In one or more embodiments, the portable asset 105 may also transfer a duress signal (for example, in an emergency situation) along with the assembled signal.

The mesh network 120 can include an array of signal repeaters. The repeaters can be arranged in any manner in the three-dimensional location that is within the vicinity of the portable asset 105. The mesh network 120 allows the detection of signals, including any duress signals, spanning a significantly greater range/area than what is covered by a conventional beacon. For example, the mesh network can encompass campuses of many buildings within a particular geographical location.

It is noted that the function of beacons and signal repeaters is quite different in the various embodiments of the invention. Signals from the beacons 110 are received by the portable asset 105, whereas the repeaters 120 receive signals transmitted by the portable asset 105. So, the signals processed are those received (from the beacons) by the portable asset 105 which are then transmitted (to the repeaters). The mesh network forwards the signal to a controller 130.

The controller 130 may include a programmable logic control unit or device (PLCD) or any programmable computing device that includes programmable logic controllers, servers, mainframes, desktop computers, laptops, and any handheld devices such as tablets and smart phones. The controller 130 can include a processor and a memory coupled to the processor. Data and other components can be stored in memory. These are executable by the processor. In addition, an operating system may be stored in the memory and executable by the processor.

In particular, a set of computer program instructions are stored in the memory and executed by the processor. The computer program instructions can be configured to process two sets of signal parameters to accurately track the portable asset 105: a first set from the Bluetooth beacons 110 in the vicinity of the mobile portable asset 105, and a second set from the mesh-based repeaters 120 in the vicinity of the mobile portable asset 105. The computer program instructions can be then configured to train a neural network using the received signal information.

The neural network facilitates accurate location tracking even if the beacons/repeaters are distributed in an ad hoc manner. This is done by training the neural network. In one aspect, training the neural network is a two-step process. In a first step, signal strength is measured at all locations within a geographical location where the portable asset may be located. The neural network training process may involve encoding this information and inputting it into the neural network. In one embodiment, the encoding process includes parsing the information, tokenizing the information, and generalizing the information. In a second step, the location of the portable asset is generated using the neural network training. The generated location is compared to the actual location of the portable asset to further train the neural network until the neural network is trained to determine a substantially accurate location.

Figure 2:
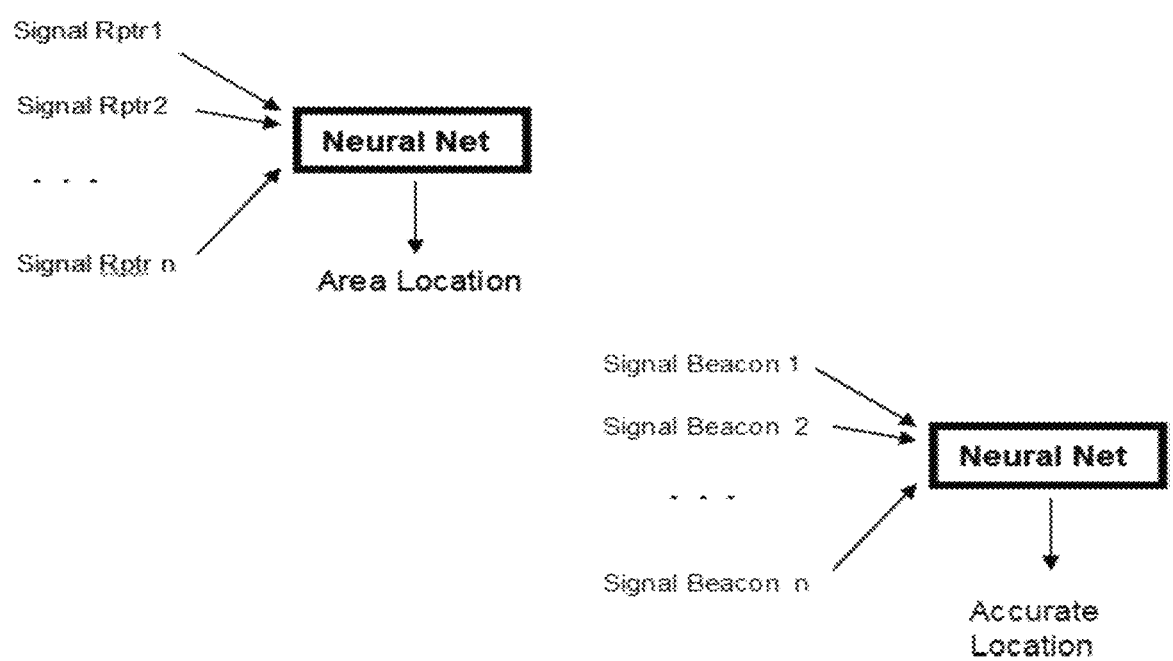

As shown in FIG. 2, the neural network is configured to determine: (1) a general section of the mesh network covered by the signal repeaters 120; and (2) a specific area within that section determined by the Bluetooth beacons 110. Together, this provides a very accurate location of the wireless portable asset 105.

In a typical deployment, the transmission range of beacons is much shorter than that of repeaters. In such cases, the density of beacons can be much higher to give a more accurate determination of the location. For instance, the beacons can be deployed in every room of a building whereas the repeaters may only be deployed in major sections or wings of the building. Since each beacon has a unique identifier, the reception of any beacon can make the location derived from the repeaters superfluous.

The multi-level signal hierarchy becomes essential when there is no beacon in range. For example, if the portable device is in range of the beacons, information can be derived that the device is in, say, Room 101 (from the beacons) and in an "East corridor of Building 1" (from the repeaters). However, if the device is out of range of any of the beacons, the system can at least derive that it is located in an "East corridor of Building 1".

The multi-level signal hierarchy is a requirement for environments where it is possible that the transmitter is out of range of any of the Bluetooth beacons, in which case, the section of the mesh network is still reporting. This redundancy provides a high level of availability, not found is single layer systems involving merely beacons or signal repeaters.

The term executable means program instructions that are in a form that can ultimately be run by the processor. The executable program instructions may be stored in any portion or component of the memory, including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, memory includes random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor may represent multiple processors and/or multiple processor cores and the memory may represent multiple memories that operate in parallel processing circuits, respectively. The processor may be of electrical or of some other available construction.

Although the tracking software application, neural network and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Figure 3:
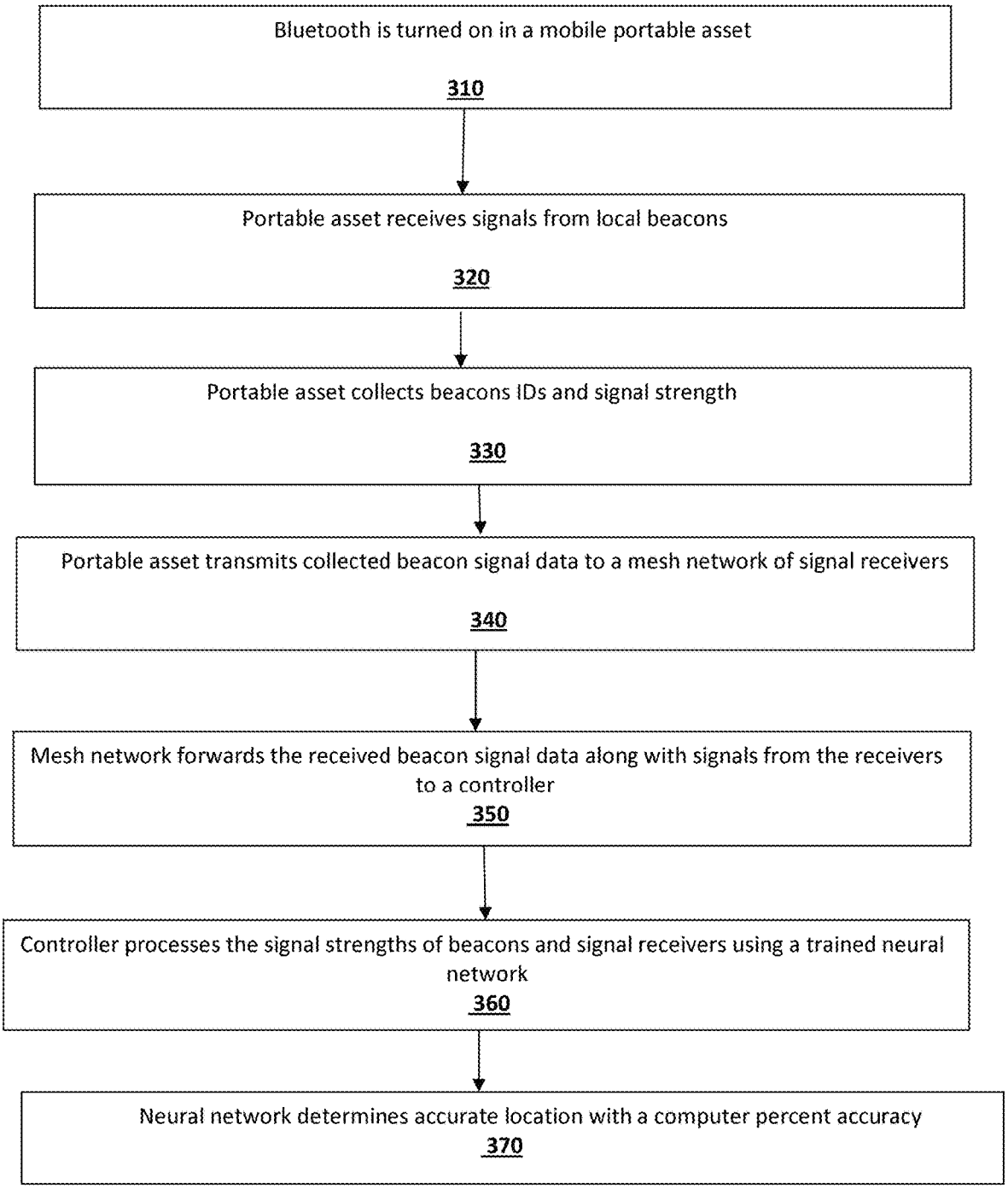

FIG. 3 illustrates a flowchart showing the functionality and operation of an implementation of the location tracking system. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

As shown in step 310, the tracking process is started by turning on the Bluetooth in the portable asset. This allows the portable asset to receive signals from beacons in its vicinity 320. A software application installed on the portable asset processes the collected beacon signals to determine at least the beacon identifier information and signal strength 330. This signal data is transmitted to a mesh network having a plurality of signal receivers/repeaters 340. The mesh network forwards the received beacon signal data along with the signals from the receivers to a controller 350. The controller processes the signal strengths of both beacons and signal receivers using a trained neural network 360. Neural network determines accurate location with a computer percent accuracy 370. This location data can be then sent to a client computing device. The client computing device may be a smartphone, tablet, laptop, and other similar devices. It is understood that the various embodiments of the present invention facilitate the location of a user/wearer of the portable asset.

The foregoing has outlined rather broadly several aspects of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed might be readily utilized as a basis for modifying or redesigning the structures for carrying out the same purposes as the invention. The foregoing has outlined rather broadly several aspects of the present invention in order that the detailed description of the invention that follows may be better understood.

What is claimed is:

1. A method for accurately detecting the location of a portable asset, comprising:
    activating the portable asset to receive a signal transmitted by a plurality of beacons in its vicinity, wherein the portable asset is an identification badge device having a button activation mechanism, and wherein activating the portable asset comprises actuating the button mechanism to receive the signal transmitted by the beacons;
    configuring the badge device to communicate a signal comprising the received signal along with a duress signal to a mesh network, wherein the mesh network comprises a plurality of signal repeaters, wherein the signal repeaters are distributed in an ad hoc manner;
    transmitting the signal comprising the received signal and the duress signal from the mesh network to a controller; and
    wherein the controller comprises a neural network,
        wherein the neural network is trained to parse the signal comprising the received signal and the duress signal to accurately determine the location of the badge device;
        wherein the neural network is trained to determine: (i) a general section of the mesh network covered by the signal repeaters; and (ii) a specific area within that section determined by the beacons.

2. The method according to claim 1, wherein the badge device includes a software application.

3. The method according to claim 2, wherein the software application is configured to process the signals received from the beacons to determine at least a signal strength and an identifier associated with the beacons.

4. The method according to claim 1, wherein training the neural network comprises measuring the signal strength within a geographical space where the badge device is potentially located.

5. The method according to claim 4, wherein the location of the badge device is generated using the neural network training.

6. The method according to claim 5, wherein the generated location is compared to an actual location of the badge device to further train the neural network until the neural network is trained to determine a substantially accurate location.

7. A location tracking system, comprising:
    an identification badge device configured to receive a signal transmitted by a plurality of beacons in its vicinity, wherein the badge device has a button mechanism, and wherein activating the badge device comprises actuating the button mechanism to receive the signal transmitted by the beacons;
    a mesh network, wherein the mesh network comprises a plurality of signal repeaters, wherein the signal repeaters are distributed in an ad hoc manner, wherein the badge device is configured to communicate a signal comprising the received signal along with a duress signal to the mesh network;
    a controller, wherein the signal comprising the received signal and the duress signal is transmitted from the mesh network to the controller; and
        wherein the controller comprises a neural network, and
        wherein the neural network is trained to parse the signal comprising the received signal and the duress signal to accurately determine the location of the badge device; and wherein the neural network is trained to determine: (i) a general section of the mesh network covered by the signal repeaters; and (ii) a specific area within that section determined by the beacons.

* * * * *